United States Patent [19]
Hughes

[11] Patent Number: 5,985,220
[45] Date of Patent: *Nov. 16, 1999

[54] METAL FOIL HAVING REDUCED PERMANENT THERMAL EXPANSION FOR USE IN A CATALYST ASSEMBLY, AND A METHOD OF MAKING THE SAME

[75] Inventor: Ernest Wilson Hughes, Erie, Pa.

[73] Assignee: Engelhard Corporation, Iselin, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,107

[22] Filed: Oct. 2, 1996

[51] Int. Cl.$^6$ .......................... B01D 53/34; B01J 21/04; B01J 21/08; B01J 21/10

[52] U.S. Cl. ........................ 422/177; 422/180; 29/890; 502/240; 502/263; 502/340; 502/341

[58] Field of Search ........................ 422/177, 180, 422/211, 222, 171, 221; 502/439, 340–341, 325, 327–328, 332–334, 339, 527.17, 240, 263; 423/213.2, 213.5, 212 C; 29/890

[56] References Cited

U.S. PATENT DOCUMENTS

| | | | |
|---|---|---|---|
| 2,658,742 | 11/1953 | Suter et al. | 432/72 |
| 2,966,449 | 12/1960 | Bouchard et al. | 204/500 |
| 3,219,730 | 11/1965 | Bliton et al. | 429/30 |
| 3,719,739 | 3/1973 | Thompson | 423/213.5 |
| 3,787,305 | 1/1974 | Ballard | 204/487 |
| 3,923,696 | 12/1975 | Chart et al. | 502/307 |
| 3,947,340 | 3/1976 | Kawagoshi et al. | 204/490 |
| 4,279,782 | 7/1981 | Chapman et al. | 423/213.5 |
| 4,288,346 | 9/1981 | Hunter et al. | 502/2 |
| 4,294,726 | 10/1981 | Bozon et al. | 423/213.5 |
| 4,329,403 | 5/1982 | Baker | 429/35 |
| 4,363,753 | 12/1982 | Bozon et al. | 423/213.5 |
| 4,414,023 | 11/1983 | Aggen et al. | 420/40 |
| 4,466,871 | 8/1984 | Kaup et al. | 204/490 |
| 4,467,050 | 8/1984 | Patel et al. | 502/330 |
| 4,567,117 | 1/1986 | Patel et al. | 429/19 |
| 4,601,999 | 7/1986 | Retallick et al. | 502/314 |
| 4,634,502 | 1/1987 | Callahan et al. | 205/148 |
| 4,671,931 | 6/1987 | Herchenroeder et al. | 420/445 |
| 4,673,663 | 6/1987 | Magnier | 502/320 |
| 4,711,009 | 12/1987 | Cornelison | 422/180 |
| 4,771,029 | 9/1988 | Pereira et al. | 502/439 |
| 4,838,067 | 6/1989 | Cornelison | 72/196 |
| 5,057,483 | 10/1991 | Wan | 423/213.5 |
| 5,080,882 | 1/1992 | Yoshimoto et al. | 423/579 |
| 5,158,654 | 10/1992 | Yoshimoto et al. | 429/32 |
| 5,211,822 | 5/1993 | Alary et al. | 204/472 |
| 5,232,671 | 8/1993 | Brunson et al. | 422/174 |
| 5,272,125 | 12/1993 | Weible et al. | 502/439 |
| 5,272,876 | 12/1993 | Sheller | 60/300 |

FOREIGN PATENT DOCUMENTS

| | | |
|---|---|---|
| 0104903 | 4/1984 | European Pat. Off. . |
| 0107352 | 5/1984 | European Pat. Off. . |
| 0390321 | 10/1990 | European Pat. Off. . |
| 2-78443 | 3/1990 | Japan . |
| 4-183898 | 6/1992 | Japan . |
| 9532053 | 11/1995 | WIPO . |
| 9730194 | 8/1997 | WIPO . |

OTHER PUBLICATIONS

K. Tanaka et al. "Anomalous Expansion of Stainless Steel Foil . . . Oxidation", Tetsue to Hagene, vol. 81, 29–84 (1995) translation.

Primary Examiner—Hien Tran
Attorney, Agent, or Firm—Beverly J. Artale

[57] ABSTRACT

A metal foil has improved resistance to permanent thermal expansion. This metal foil includes a metal foil substrate and a thin barrier layer on at least one surface of the metal foil substrate. The metal foil can be used in a catalyst assembly to provide a catalyst support having improved resistance to permanent thermal expansion. The catalyst assembly includes a metal foil substrate and a thin barrier layer on at least one surface of the metal foil substrate. A catalyst material is provided on at least a portion of the barrier layer. This invention further relates to a method for reducing permanent thermal expansion of a metal foil. This method includes applying a barrier layer coating to at least one surface of a metal foil substrate. The method further can include the step of applying a catalyst material to at least a portion of the barrier layer.

23 Claims, 4 Drawing Sheets

METAL FOIL HAVING REDUCED PERMANENT THERMAL EXPANSION FOR USE IN A CATALYST ASSEMBLY, AND A METHOD OF MAKING THE SAME

BACKGROUND OF THE INVENTION

Since the middle 1970's, catalytic converters have been required equipment for the treatment of exhaust gas from internal combustion engines in vehicles. The primary purpose of these devices is to convert, by catalytic means, the noxious exhaust gas components of hydrocarbon fueled engines into harmless materials, such as carbon dioxide, nitrogen and water. More recently, additional efforts have been made to trap and oxidize products of incomplete combustion, such as particulates of carbons, that are generated in relatively large quantities by diesel powered engines.

Up to the present, the supports for the catalysts or the particulate traps which promote the desired pollution reducing effects have been made from ceramic or metal monoliths in the form of a "honeycomb." Honeycomb type catalytic converters typically include a large number of narrow passageways through which the exhaust gas must traverse before exiting the catalyst assembly. The inner walls and/or passages of these monolithic honeycombs are coated with a precious metal catalyst, or a plurality of catalysts, such as platinum, palladium, rhodium and/or iridium, that promote the catalytic conversion of the noxious exhaust gas components. A typical cross section of a honeycomb catalyst includes, for example, 10 to 300 passages per square centimeter. Hot exhaust gas coming into contact with the catalyst material undergoes chemical changes which convert the noxious exhaust gas components into water, carbon dioxide and nitrogen.

Metal honeycomb catalytic converters are typically made from an arrangement of flexibile metal substrates or metal foils which provide a plurality of gas passages. "Metal foils," as that term is used in this specification, means any thin metal or metal alloy, having two main or major surfaces, that is used as a substrate for a coating layer. Typically, such metal foils are 0.001 to 0.010 inches thick and are used to carry various catalytic coatings, such as washcoats and catalyst materials. Preferably, such metal foils may have a thickness in the range of 0.0015 to 0.003 inches.

Dynamic changes to the catalytic converter may occur during use. For example, catalytic converters become heated to extremely high temperatures by virtue of the hot exhaust gases. The exhaust gas temperature of an internal combustion engine of an automobile can reach temperatures as high as 1000° C. and higher, and likewise, the honeycomb element of a catalytic converter can reach these same high temperatures.

Metal foils have a positive thermal expansion coefficient and tend to expand or become somewhat larger in dimension as a result of exposure to high temperatures. When used as substrates in a honeycomb catalyst support, such a dimensional increase in the size of metallic foils can constrict the size of the exhaust gas flow passages in the honeycomb body, thereby causing an increase in the backpressure on the engine. In particular, if the metal foil substrate is attached to another part of the catalytic converter or contained within a housing, such as a jacket for the catalytic converter, such thermal expansion can cause pronounced backpressure problems.

In some cases, thermal expansion in metal foils is reversible by simply cooling the substrate. However, it has been found that metal foils typically used as supports in metal catalytic converters can become permanently enlarged after exposure to high temperatures during use of the catalyst. This permanent thermal expansion phenomenon is an irreversible increase in the dimensional size of a metal foil and will be hereinafter referred to as metal foil "growth" in this specification.

Metal foil growth have been associated with specific catalytic layers applied thereto. For example, thermal expansion in metal foils made from ferritic stainless steel has been reported to be greatest when the foils are coated with catalyst containing compounds of cerium, lanthanum and/or yttrium. K. Tanaka, et al., "Anomalous Expansion Of Stainless Steel Foil For Metal Honeycomb Catalytic Converters Induced By High-Temperature Oxidation," *Tetsu to Hagane*, Vol. 81. No. 8, pp. 79–84, 1995. This article is entirely incorporated herein by reference. Additionally, certain metal foil alloys have been found to be more susceptible to permanent thermal expansion than others. For example, stainless steel, such as FeCrAl alloys, typically are more susceptible to this permanent foil growth as compared to NiCr and NiCrAl alloys.

It is difficult to predict the degree to which metal foils will be permanently enlarged. For example, in laboratory testing, the amount of foil growth observed for an FeCrAl metal foil coated with a catalytic layer has been as high as 18% when the metal foil was exposed to 950° C. for 64 hours. Typically, when a catalytic layer containing cerium and lanthanum was applied to a commercially available FeCrAl alloy metal foil, such as Allegheny Ludlum's Alfa IV, the average foil growth after exposure to 1000° C. for 25 hours was 6.8%. Foil growths as high as 10% and as low as 3.7% were observed under these heating conditions.

Because of the difficulty in predicting the degree of permanent expansion of metal foils, it can be difficult to design a catalytic converter system that maintains the dimensional balance necessary to achieve adequate contact between the exhaust gas and the catalyst without producing excessive fuel consumption or backpressure on the engine. Additionally, changes in the dimensional size of the metal foils can impair the integrity of mechanical structures or joints in the converter, e.g., the changed size of the foils may cause welded or brazed joints to become weakened or detached, or it may cause the foil to escape from clamping devices, or the like. Furthermore, even after permanent thermal expansion has occurred in the metal foils, the foils are still subject to further thermal expansion during heating (i.e., the normal, reversible thermal expansion exhibited by metal parts). This additional expansion causes further stresses on joints and the mechanical integrity of the catalyst system.

Accordingly, there is a need in the art for novel processes and compositions to prevent and/or control the degree of permanent thermal expansion of a metal foil when exposed to high temperatures. There is also a need for metal catalyst supports and catalyst assemblies in which problems associated with metal foil growth are minimized during use in high temperature environments.

SUMMARY OF THE INVENTION

This invention seeks to overcome these and other problems associated with permanent thermal expansion of metal foils by providing a metal foil having improved resistance to permanent thermal expansion. The metal foil is coated with a thin barrier layer which inhibits the rate of permanent thermal expansion the metal foil during exposure high temperatures. The improved metal foil substrate is useful in various high temperature applications, and in particular, is useful as supports in catalytic converter devices.

In another aspect of the invention, a catalyst assembly is provided wherein the catalyst assembly includes a metal foil having improved resistance to permanent thermal expansion. As noted above, the metal foil used in this catalyst assembly includes a metal foil substrate and a thin barrier layer on at least a portion of at least one surface of the metal foil substrate. A catalyst material, including any desired washcoats and precious metal catalytic elements, is provided on at least a portion of the barrier layer.

The invention further provides a method for reducing permanent thermal expansion of a metal foil. This process includes applying a thin barrier layer coating to at least one portion of at least one surface of a metal foil substrate.

A still further object of the invention is to provide a method for producing an improved honeycomb body from metal foil substrates, which body exhibit reduced back pressure problems due to thermal expansion of the metal foil during extended use at high temperatures.

BRIEF DESCRIPTION OF THE DRAWINGS

These and other advantageous aspects of the invention will be evident from the following detailed description, which should be considered in conjunction with the attached drawings, wherein:

FIG. 1 shows the FeCrAl metal foil growth for an untreated foil sample and for foil samples treated with the following different types of barrier layers: (a) magnesium oxide only; (b) a combination of aluminum oxide and silicon dioxide; and (c) a combination of aluminum oxide, silicon dioxide and magnesium oxide.

FIG. 2 illustrates growth of an FeCrAl metal foil obtained from Allegheny Ludlum with regard to various barrier layer and heat treatment conditions.

FIG. 3 illustrates the foil growth results for various different barrier layers on FeCrAl metal foils produced by VDM.

FIG. 4 illustrates foil growth test results for various different barrier layers on FeCrAl metal foils produced by Sandvik Steel.

DETAILED DESCRIPTION OF THE INVENTION

Figure 1:
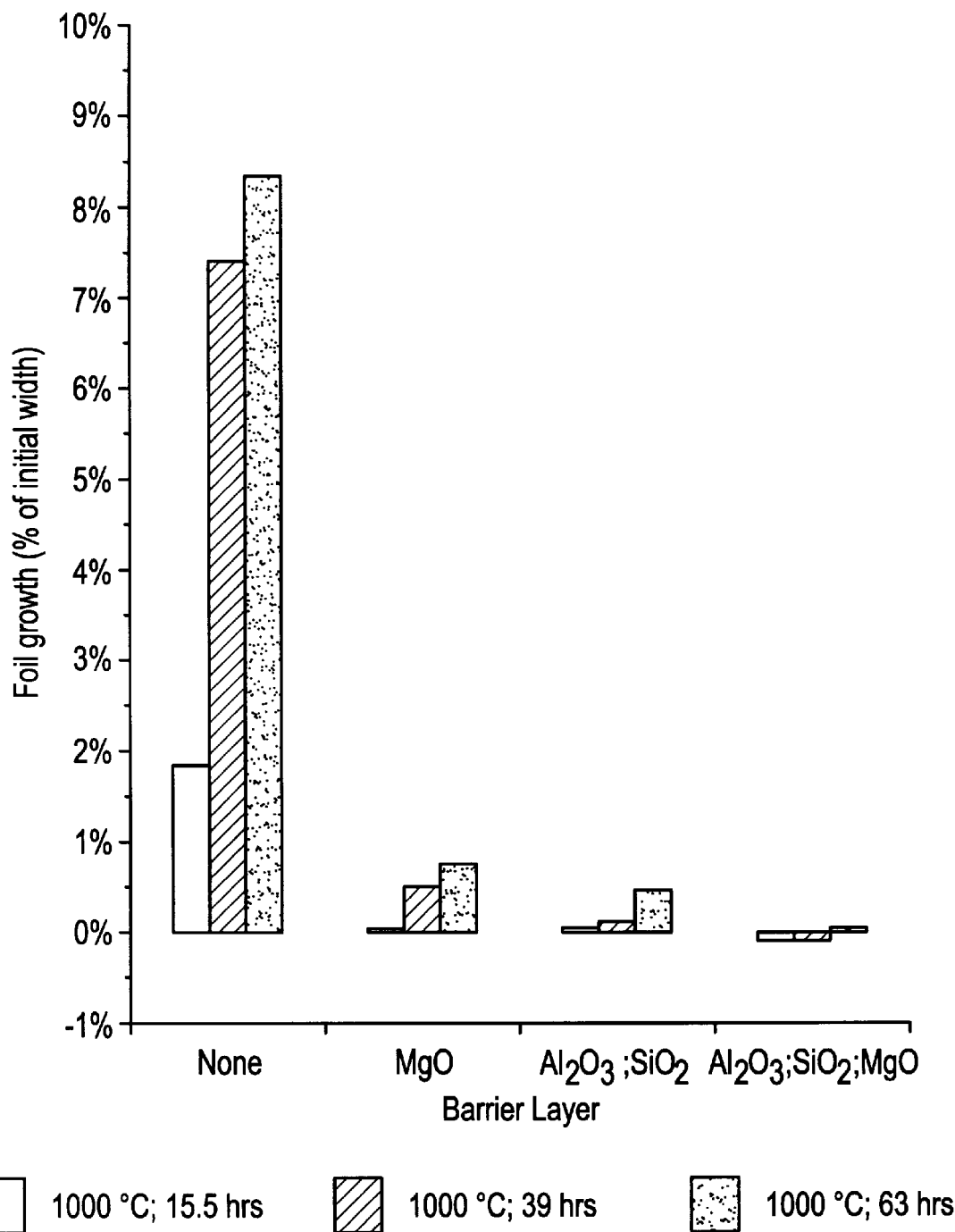
FIGS. 1–4 graphically illustrate the effectiveness of different barrier layers in accordance with the invention at preventing or inhibiting permanent thermal expansion of metal foils, under a variety of heat treating conditions, on metal foils supplied by different manufacturers.

In accordance with the invention, it has been observed that the magnitude of metal foil growth can be reduced measurably when a barrier layer is placed on at least a portion of at least one surface of the metal foil. In metal foils used as catalyst supports, preferably, the barrier layer is placed between the metal foil surface and the catalytic layer. As used in this specification, the term "barrier layer" means a thin layer of inorganic material that is formed on at least a portion of at least one metal foil surface to inhibit or prevent permanent thermal expansion of the metal foil. The term "barrier layer coating" refers to the coating composition applied to the foil substrate which, after optional treatment steps (e.g., drying, calcining, and/or cooling), if necessary, provides the barrier layer. Preferably, the barrier layer is provided directly on the surface of the metal foil itself, and may be located beneath any washcoats and catalyst elements that may be applied to the metal foil.

As used in this specification, "thin" as it relates to a barrier layer refers to a thickness in the range of 0.00005 to 0.005 inches, wherein 0.0001 to 0.003 inches is preferred, and 0.0003 to 0.002 inches is particularly preferred.

In accordance with the invention, a thin barrier layer coating is applied to at least a portion of at least one surface of the metal foil substrate. This barrier layer coating is dried, and optionally calcined to form a barrier layer that inhibits or prevents permanent thermal expansion of the metal foil substrate when the substrate is exposed to high temperatures (e.g., 600° C. or higher). After the barrier layer is applied, a catalyst material, e.g., including a washcoat and/or precious metal catalytic elements, can be applied over the barrier layer to provide a catalyst assembly.

The barrier layer of the invention comprises at least one oxide of a metal selected from the group consisting of alkaline earth metals (i.e. metals listed in Group IIa of the Periodic Table of Elements), metals listed in Group IIIa of the Periodic Table of the Elements, metals listed in Group IV of the Periodic Table of Elements, and combinations thereof. Preferably, the barrier layer of the invention comprises at least one metal oxide selected from the group consisting of silicon dioxide ($SiO_2$), magnesium oxide (MgO), titanium dioxide ($TiO_2$), calcium oxide (CaO), zirconium dioxide ($ZrO_2$) and combinations thereof, alone or in combination with aluminum oxide ($Al_2O_3$).

The barrier layer is obtained by coating on the metal foil substrate a barrier layer coating of the desired metal oxide(s) and/or metal oxide precursor(s). For purpose of this invention, a metal oxide precursor includes a metal containing compound which decomposes upon heating to form a metal oxide. Suitable metal oxide precursors include, but are not limited to, metal hydroxide, metal carbonates, metal acetates, and the like, e.g., magnesium hydroxide, calcium carbonate, calcium acetate monohydrate, magnesium acetate hydrate, zirconium acetate, and the like. Mixtures of various different metal oxides and/or metal oxide precursors can be used to provide the barrier layer coating in the process of the invention. After the barrier layer coating is applied, but prior to applying a catalytic material (e.g., a washcoat, catalyst, etc.), the barrier layer coating, is dried and optionally calcined. By heating and/or calcining the barrier layer coating, any metal oxide precursors contained in the coating are converted to the corresponding oxide.

Suitable barrier layer coating include a mixture of metal oxide(s) and/or metal oxide precursors in a suitable solvent. Preferably, the solvent is water; however, it is within the scope of the invention to use organic or inorganic solvents to prepare coating mixtures useful in this invention. Typically, the barrier layer coating comprises a water based slurry of the desired metal oxide(s) and/or metal oxide precursor(s). The barrier layer coating may be applied to the metal foil substrate by any conventional coating method, e.g., spray coating, dip coating, applicator coating, flow coating, brush coating, roll coating, coating by electrophoretic deposition, etc.

Depending on the desired composition of the barrier layer, the barrier layer coating may be applied in one or more layers. For example, when two or more metal oxide and/or oxide precursors are to be included in the barrier layer, the oxides or precursors can be applied simultaneously in an appropriate coating mixture, such as a water based slurry. Alternatively, each metal oxide or metal oxide precusor can be applied separately to provide a multilayered barrier layer. For example, an aluminum oxide layer can be applied to the metal foil substrate first, and thereafter, a silicon dioxide or a magnesium oxide layer can be applied over the aluminum oxide layer. A single drying and calcining step can be used when the barrier layer coating is applied as two separate layers, although, if desired, each barrier layer coating can be separately dried and calcined. The various amounts of the different oxide materials or precursors can be controlled so as to be within any desired relative weight percent range described above. Furthermore, in this procedure. as noted above, suitable oxide precursors may be used in the coating mixture.

As will be obvious to one skilled in the art, the total concentration of metal oxide(s) and/or metal oxide precursor (s) in the barrier layer coating will vary depending upon such factors as the method of application, the metal oxide(s) and/or metal oxide precursor(s) used, the rheology of the coating mixture and the foil composition, etc. In general, the solid contents of aqueous slurries are kept at about 15 to about 45 weight percent of the slurry. For dip coating, the preferred solid contents of the aqueous slurries ranges from about 25 to about 40 weight percent of the slurry. For spraying, the preferred solid contents of the aqueous slurry ranges from about 20 to about 30 weight percent of the slurry.

The amount of specific metal oxide (s) and/or metal oxide precursor(s) used in the barrier layer coating is any amount sufficient to provide a barrier layer which inhibits the rate of permanent thermal expansion of a metal foil. The relative amounts of the different metal oxides and/or metal oxide precursors which can be used in the barrier coatings will vary depending upon the metal oxide(s) and/or metal oxide precursor(s) used. For example, magnesium oxide and/or magnesium oxide precursors can be present in the barrier layer coating so as to produce a barrier layer having at least 2% magnesium oxide (by weight), and preferably 3% (by weight), based on the total weight of the barrier layer. Preferably, the magnesium oxide and/or magnesium oxide precursor content in the barrier layer coating provides a barrier layer having a magnesium oxide content in the range of 2–15% (by weight), based on the total weight of the barrier layer. Narrower weight percentage ranges of 3–10% and 5–8% magnesium oxide in the barrier layer provide suitable results.

When the barrier layer coating includes a combination of (a) magnesium oxide and/or a magnesium oxide precursor, and (b) aluminum oxide and/or an aluminum oxide precursor, the magnesium oxide content in the final barrier layer may be as high as 50% by weight. The narrower magnesium oxide content ranges described above, however, are preferred (i.e., 2–15%, 3–10% and 5–8% (all of these percentages are weight percentages based on the total weight of the barrier layer)). Likewise, when the barrier layer coating includes (a) magnesium oxide and/or a magnesium oxide precursor, and (b) silicon dioxide and/or a silicon dioxide precursor, the magnesium oxide content in the final barrier layer may be as high as 50% by weight, but the narrower ranges described above (i.e., 2–15%, 3–10% and 5–8%) also provide suitable results.

In an embodiment of the invention where the barrier layer coating includes (a) magnesium oxide and/or a magnesium oxide precursor, (b) silicon dioxide and/or a silicon dioxide precursor, and (c) aluminum oxide and/or an aluminum oxide precursor, it is preferred that the barrier layer coating produce a barrier layer having at least 2% magnesium oxide, by weight, and at least 5% silicon dioxide, by weight, based on the total weight of the barrier layer. Preferably, the magnesium oxide content in the barrier layer is at least 3% by weight. Also, in this embodiment, it is preferable that the aluminum oxide and/or its precursor(s) be present in the barrier layer coating so as to provide a barrier layer having at least 40% by weight aluminum oxide, based on the total weight of the barrier layer. Preferably, this aluminum oxide content is at least 50% by weight.

When the barrier layer includes magnesium, silicon and aluminum oxides (any of which may be obtained from suitable precursor(s)), various content ranges of these ingredients can be provided in suitable barrier layers. The following Table describes some of the exemplary ranges of these various components:

TABLE 1

| Magnesium Oxide | Silicon Dioxide | Aluminum Oxide |
|---|---|---|
| 2–15% | 5–60% | Balance |
| 3–10% | 5–60% | Balance |
| 3–10% | 5–10% | Balance |
| 2–15% | 35–60% | Balance |
| 3–10% | 35–60% | Balance |
| 2–15% | Balance | 40–98% |
| 3–10% | Balance | 50–97% |
| 2–15% | 5–60% | 40–93% |
| 3–10% | 35–60% | 40–62% |

In this Table, all percentages are by weight, based on the total weight of the barrier layer.

In certain preferred embodiments of the invention, the magnesium oxide content is in the range of 5–8% (by weight), the silicon dioxide content is in the range of 5–8% (by weight), and aluminum oxide makes up the balance of the barrier layer. In additional preferred embodiments of the invention, the magnesium oxide content is in the range of 5–8% (by weight), the silicon dioxide content is in the range of 40–50% (by weight), and aluminum oxide makes up the balance of the barrier layer.

The barrier layer in accordance with the invention is continuous or discontinuous on at least a portion of at least one surface of the metal foil substrate. Preferably, the barrier layer is continuous. It also is preferred that the barrier layer be included on both major surfaces of the metal foil substrate.

A preferred barrier layer in accordance with this invention comprises (a) aluminum oxide and/or an aluminum oxide precursor, and (b) silicon dioxide and/or a silicon dioxide precursor. Another barrier layer of the invention barrier layer comprises (a) aluminum oxide and/or an aluminum oxide precursor, and (b) magnesium oxide and/or a magnesium oxide precursor. Still another barrier layer in accordance with the invention may comprise (a) magnesium oxide and/or a magnesium oxide precursor, and (b) silicon dioxide and/or a silicon dioxide precursor. When combinations of two oxides and/or oxide precursors are used in the barrier layer coatings, typically the oxides or oxide precursors are present so as to provide a total amount of greater than 1 milligrams of barrier layer per square inch of the final barrier layer (i.e., after drying and calcining). Preferably, a total amount of 2 to 20 milligrams of the oxide are provided per square inch of the barrier layer, and preferably 4 to 16 milligrams barrier layer per square inch of the barrier layer can be provided. Advantageously for certain embodiments of the invention, the oxides or oxide precursors are present so as to provide a total amount of 10 to 16 milligrams barrier layer per square inch of the final barrier layer.

Additional preferred embodiments of the invention include a barrier layer having (a) aluminum oxide and/or an aluminum oxide precursor, (b) silicon dioxide and/or a silicon dioxide precursor, and (c) magnesium oxide and/or a magnesium oxide precursor. In this event, when combinations of three of metal oxides and/or oxide precursors are provided in the barrier layer coating, the oxides and/or the oxide precursors may be comprised in the coating so as to provide a total amount of greater than 0.4 milligrams barrier layer per square inch of the final barrier layer. Any suitable range of the oxide and/or the oxide precursor content may be used so as to provide a total amount of 0.4 to 16 milligrams barrier layer per square inch of the final barrier layer. A narrower range of 0.4 to 4 milligrams per square inch of the barrier layer can be provided, and a still narrower range of 0.5 to 3 milligrams barrier layer per square inch of the barrier layer also is suitable.

The barrier layers in accordance with the invention can be used in conjunction with typical washcoat material, i.e. ceramic metal oxide washcoats, and various catalyst elements. Examples of catalytic element include, but are not limited to, cerium, lanthanum, yttrium, niobium, titanium, molybdenum, thallium, platinum, palladium, rhodium and iridium. Preferably, the catalyst element is a noble metal catalyst.

The improved metal foil substrate of the invention may be used as catalyst supports in a variety of catalyst assemblies. In particular, the metal foil substrates maybe folded, wound or otherwise arranged to provide a honeycomb carrier body for a catalytic converter devices. It is within the scope of the invention to provide washcoat and or catalyst material on the metal foil substrate prior to or after forming the substrate to provide the carrier body.

In accordance with the present invention, the percent reduction in permanent thermal expansion is determined as follows. A metal foil (e.g., an FeCrAl foil) is provided with a thin barrier layer coating in a manner that will be described in more detail below. After the barrier layer coating is applied, dried and calcined (if desired) to form the barrier layer, a dimension (e.g., length or width) of the barrier layer treated metal foil is measured ("$D_{Treated}$"), and a similar dimension of an untreated metal foil sample (an untreated standard sample) is measured ("$D_{Untreated}$"). A catalyst material (e.g., a Ce/La catalyst) is applied to the two foils. After the catalyst layer is dried and/or calcined, the two foils are exposed to high temperatures for an extended period of time. After the foils cool, the same dimension of each foil sample is again measured, and the change in the measured dimension is expressed as a percentage based on the original dimension, as shown by the following equations:

(1) % Growth=($D_{Treated,\ After\ Heating}$−$D_{Treated,\ Before\ Heating}$)/$D_{Treated,\ Before\ Heating}$; and (2) Std. % Growth=($D_{Untreated,\ After\ Heating}$−$D_{Untreated,\ Before\ Heating}$)/$D_{Untreated,\ Before\ Heating}$.

Then, the percentage reduction in permanent thermal expansion is determined based on the following equation:

(3) % Reduction=(Std. % Growth=% Growth)/Std. % Growth.

As noted above, in accordance with the invention, the % Reduction value is at least about 30%. Preferably, the barrier layers in accordance with the invention reduce permanent thermal expansion of metal foil (i.e., growth) by at least 60%, and at least 80% or more is particularly preferred. In some instances, as will be shown below, the barrier layers actually induced a reduction in the measured dimension (i.e., shrinkage) of the metal foil. The typical dimensions of a foil piece used in making these percent growth and percent reduction determinations are 2 inches×3 inches×0.002 inches.

The invention will be described below in terms of various specific examples. These examples should be construed as illustrating the invention, and not as limiting the same.

EXAMPLE 1

A water based slurry having a solids content of 49% weight and containing 88.3% (dry weight) of aluminum oxide, 7.6%(dry weight) of aluminum hydroxide and 4.0% (dry weight) of magnesium hydroxide was prepared. The pH of the slurry was adjusted by the addition of nitric acid to about 3.5.

A piece of FeCrAl metal foil was coated with the slurry composition. The coated foil substrate was dried and calcined at about 550° C. for 30 seconds, thereby converting aluminum hydroxide to aluminum oxide and forming a barrier layer having 3 milligrams of barrier layer materials per square inch of metal foil substrate (measured after drying and calcining). The coated metal foil piece and an untreated FeCrAl metal foil standard piece were coated with a Ce and La containing catalytic coating. After exposure to 1000° C. for 8 hours, the untreated standard sample had a metal foil growth of 5.4%. The aluminum oxide/aluminum hydroxide/magnesium hydroxide coated sample had a growth of only 1.4%. Thus, the foil coated with a barrier layer coating displayed a significantly increased resistance to foil growth as compared to the uncoated foil.

EXAMPLE 2

A water based slurry having a solids content of 32% weight and containing 46.1% (dry weight) of aluminum oxide, 4.5% (dry weight) of aluminum hydroxide and 8.2% (dry weight) of magnesium hydroxide was prepared. The pH of the slurry was adjusted by the addition of nitric acid to about 3.5.

A piece of FeCrAl metal foil was coated with a water based slurry containing the above noted ingredients. After drying and calcining at about 550° C. for 30 seconds, it was found that the barrier layer was present in an amount of 2 mg/in$^2$. The treated sample and an untreated standard sample of the metal foil were coated with a cerium and lanthanum containing catalytic coating. After exposure to 1000° C. for 64 hours, the untreated standard sample had a growth of 10.4%, while the treated sample had no measurable foil growth.

EXAMPLE 3

The water based slurry as described in Example 2 was coated on FeCrAl metal foils that are commercially available from VDM and Sandvik. The barrier layer and catalytic layer coating processes were also followed in the manner described above in Example 2. After exposure to 1000° C. for 64 hours, an untreated Sandvik foil had a metal foil growth of 8.4%, while the barrier layer coated metal Sandvik foil had 0.4% shrinkage (i.e., −0.4% growth). The untreated VDM metal foil had an 8.8% metal foil growth increase, while the barrier layer coated VDM metal foil had 0.3% shrinkage. Sandvik and VDM metal foils typically shrink during heat treatment if no catalytic layer is applied to the foils.

EXAMPLE 4

Several different barrier layers were applied to FeCrAl alloy metal foil substrates. In each instance, after the oxide barrier layer was applied to the metal foil, a Ce/La catalyst was applied over the barrier layer.

The FeCrAl metal foil growth for an untreated foil sample and for foil samples treated with the following different types of barrier layers: (a) magnesium oxide only; (b) a combination of aluminum oxide and silicon dioxide; and (c) a combination of aluminum oxide, silicon dioxide and magnesium oxide. The barrier layers were applied by coating a water based slurry of the necessary ingredient(s) onto the metal foil, and then drying and calcining the coated foil. After drying and calcining, a Ce/La catalyst layer was applied, dried and calcined. The foils then were exposed to one of three different heat treatment conditions as follows: (a) 1000° C. for 15.5 hours; (b) 1000° C. for 39 hours; and (c) 1000° C. for 63 hours.

As shown in the graph of FIG. 1, for a given heat treatment temperature, as the time of heat treatment increased, the metal foil growth generally increased. All of the barrier layer treated samples showed a significant decrease in metal foil growth as compared to the untreated samples. Generally, the barrier layers that included a combination of different oxides performed better than the barrier layers including a single oxide material. The combination of aluminum oxide, magnesium oxide and silicon dioxide performed particularly well in decreasing permanent thermal expansion of the metal foils.

EXAMPLE 5

Growth of an FeCrAl metal foil obtained from Allegheny Ludlum with regard to various barrier layer and heat treatment conditions was observed. The barrier layers were provided by coating the metal foils with a water based slurry in the manner described above in Example 4. Barrier layers tested included (a) combinations of aluminum oxide and magnesium oxide at 2, 9 and 13 mg/sq in of barrier layer; and (b) combinations of aluminum oxide, magnesium oxide and silicon dioxide at 1 and 2 mg/sq. in of barrier layer. The samples were heat treated under one of the following regimes: (a) 1000° C. for 48 hours; (b) 1000° C. for 90 hours; and (c) 1000° C. for 267 hours.

Figure 2:
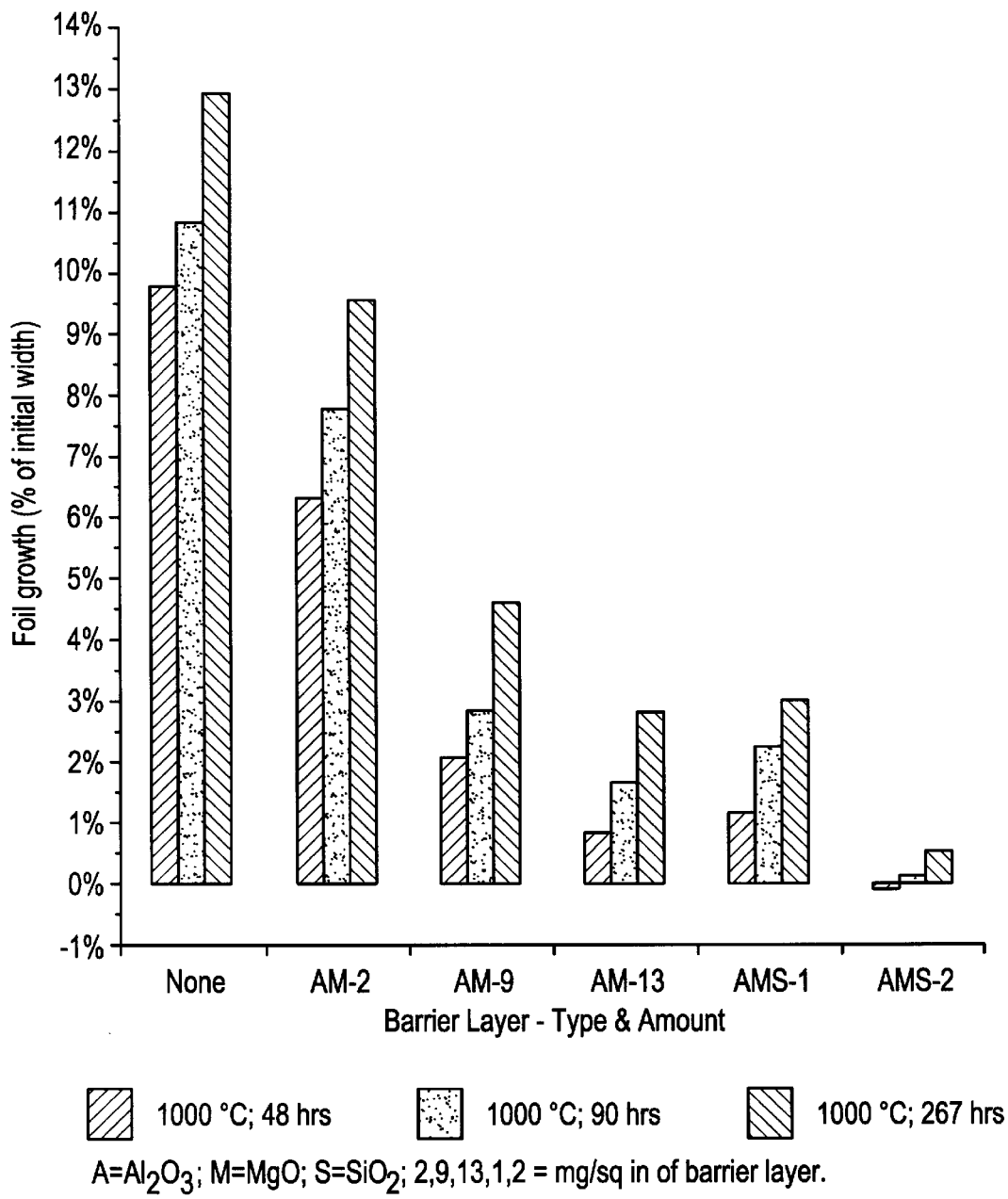

As shown in FIG. 2, all of the barrier layers were effective in reducing foil growth. Notably, relatively high amounts of the aluminum oxide and magnesium oxide mixtures (at 9 and 13 mg/in$^2$) performed comparably to 1 mg/in$^2$ of the mixture of aluminum oxide, magnesium oxide and silicon dioxide. 2 mg/in$^2$ of the mixture of aluminum oxide, magnesium oxide and silicon dioxide essentially stopped foil growth in all of the heat treatment regimes tested.

In FIG. 2, "AM-2" stands for a barrier layer including a mixture of aluminum oxide and magnesium oxide in an amount of 2 mg/in$^2$. "AM-9" and "AM-13" stand for a barrier layer including a mixture of aluminum oxide and magnesium oxide in an amount of 9 mg/in$^2$ and 13 mg/in$^2$, respectively. "AMS-1" artd "AMS-2" stand for a barrier layer including a mixture of aluminum oxide, magnesium oxide and silicon dioxide in an amount of 1 mg/in$^2$ and 2 mg/in$^2$, respectively.

EXAMPLE 6

Foil growth results for various different barrier layers on FeCrAl metal foils produced by VDM were observed. The heat treatment conditions were the same as those described above in Example 5. Results are shown in FIG. 3.

Figure 3:
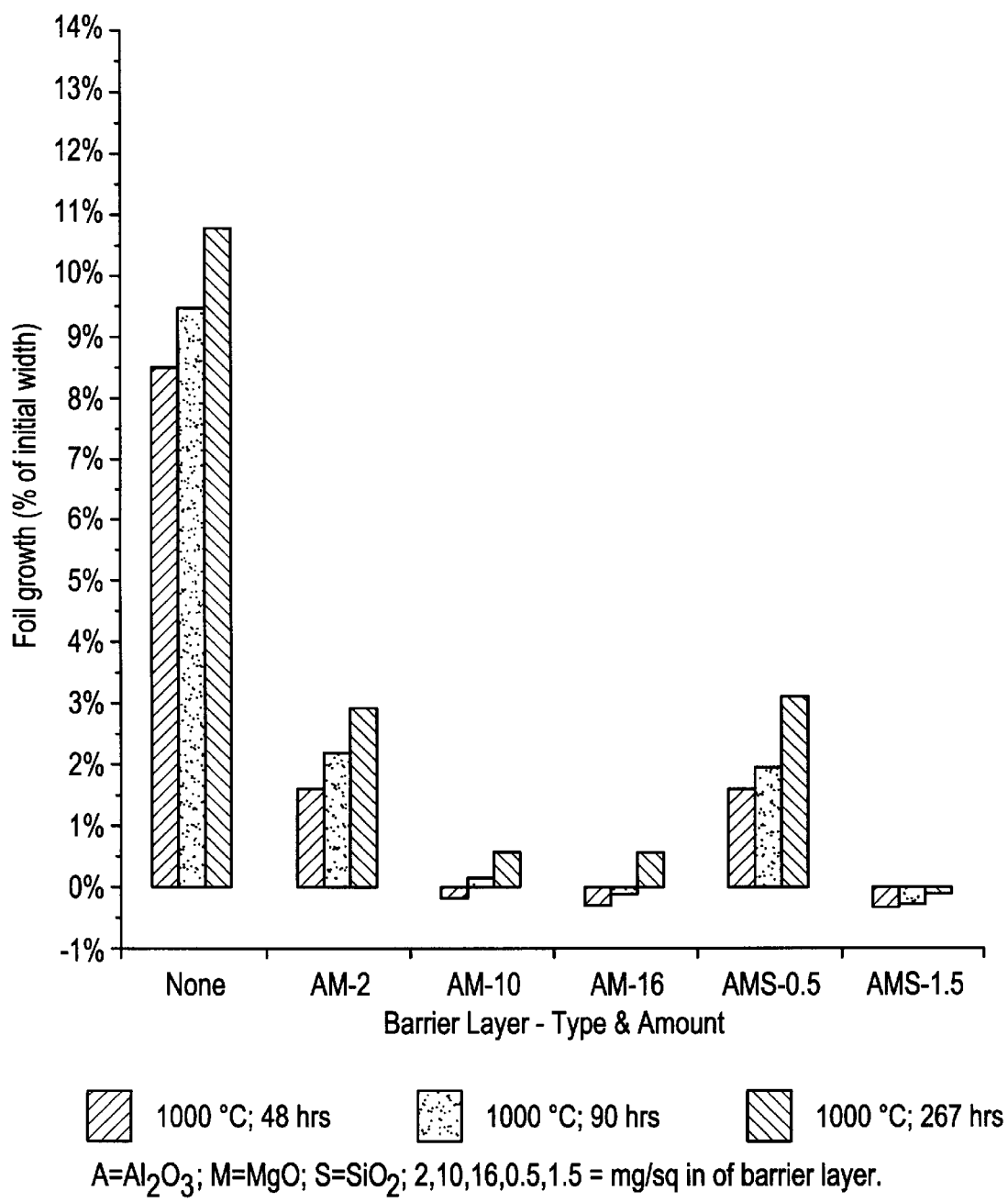

"AM" and "AMS" in FIG. 3 have the same meanings as described above with respect to FIG. 2. The numeric amounts given after "AM" and "AMS" represent the amount of barrier layer present on the metal foil, in units of "mg/in$^2$," as generally described above.

Again, all of the barrier layers applied to the metal foils were effective in reducing foil growth. High amounts (10 and 16 mg/in$^2$) of a barrier layer including a mixture of aluminum oxide and magnesium oxide were very effective in reducing foil growth. A barrier layer including 1.5 mg/in$^2$ of a mixture of aluminum oxide, magnesium oxide and silicon dioxide induced minor shrinkage of the metal foil in all of the heat treatment regimes tested. A mixture of 2 mg/in$^2$ aluminum oxide and magnesium oxide was about equally effective as 0.5 mg/in$^2$ of a mixture of aluminum oxide, magnesium oxide and silicon dioxide.

EXAMPLE 7

Foil growth test results for various different barrier layers on FeCrAl metal foils produced by Sandvik Steel were observed. Once again, the heat treatment conditions were the same as those described above in Example 5. Results are recorded in FIG. 4.

Figure 4:
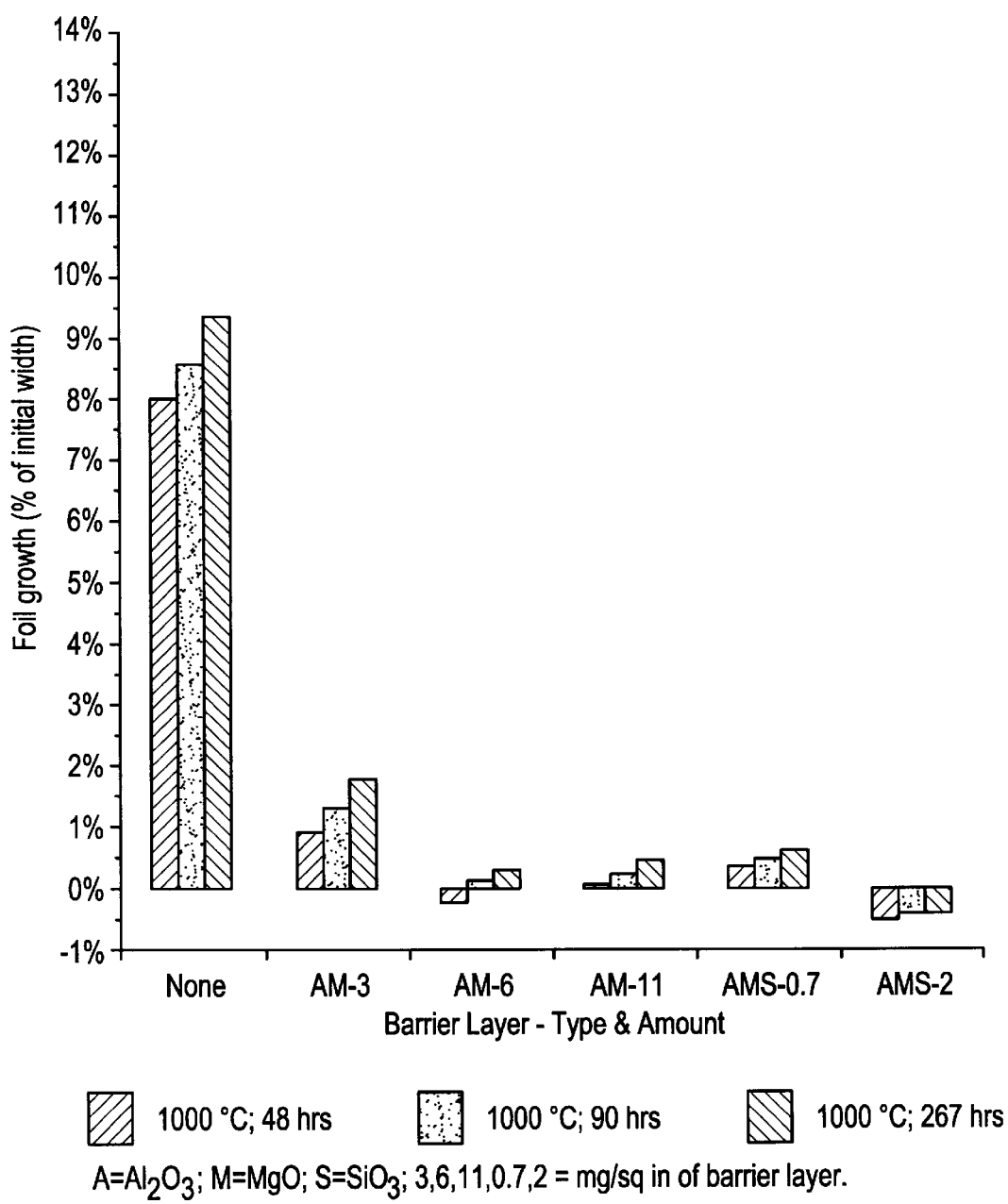

"AM" and "AMS" in FIG. 4 have the same meanings as described above with respect to FIGS. 2 and 3, and the numeric amounts given after "AM" and "AMS" represent the amount of barrier layer present on the metal foil, in units of "mg/in$^2$."

Again, all of the barrier layers applied to the metal foils were effective in reducing foil growth. The higher amounts (6 and 11 mg/in$^2$) of a barrier layer including a mixture of aluminum oxide and magnesium oxide were very effective in reducing foil growth, as was a barrier layer including 0.7 mg/in$^2$ of a mixture of aluminum oxide, magnesium oxide and silicon dioxide. A mixture of 2 mg/in$^2$ of aluminum oxide, magnesium oxide and silicon dioxide induced minor shrinking of the metal foil under all of the heat treatment conditions tested.

In this application, various commercial suppliers and sources are identified with respect to materials used in accordance with the invention. Such commercial suppliers are provided for the purpose of illustrating and describing the invention, and should not be construed as limiting the invention. In addition, in describing the specific examples, various process steps are discussed. It should be appreciated that certain of the steps discussed are optional and further that all steps need not necessarily be carried out in the order named.

While the invention has been described in terms of various specific preferred embodiments and specific examples, those skilled in the art will recognize that various changes and modifications can be made without departing from the spirit and scope of the invention, as defined in the appended claims.

I claim:

1. A metal foil having improved resistance to permanent thermal expansion in the presence of a rare-earth metal containing catalyst, said foil comprising
   a metal foil substrate; and
   a thin barrier layer coated directly on at least a portion of at least one surface of the metal foil substrate, wherein the barrier layer consists essentially of aluminum oxide, silicon dioxide and at least 2% magnesium oxide by weight based on the total weight of the barrier layer, and wherein the barrier layer is present on the surface of the foil in an amount of at least 1.5 milligrams barrier layer material per square inch of barrier layer.

2. A metal foil according to claim 1, wherein the barrier layer includes 3–10% magnesium oxide, by weight, based on the total weight of the barrier layer.

3. A metal foil according to claim 1, wherein the barrier layer includes 2–15% magnesium oxide, by weight, and 5–10% silicon dioxide, by weight, based on the total weight of the barrier layer.

4. A metal foil according to claim 1, wherein the barrier layer includes 3–10% magnesium oxide, by weight, and 35–60% silicon dioxide, by weight, based on the total weight of the barrier layer.

5. A metal foil according to claim 1, wherein the barrier layer includes 3–10% magnesium oxide, by weight, and 50–97% aluminum oxide, by weight, based on the total weight of the barrier layer.

6. A metal foil according to claim 1, wherein the barrier layer includes 3–10% magnesium oxide, by weight, 35–60% silicon dioxide, by weight, and 40–62% aluminum oxide, by weight, based on the total weight of the barrier layer.

7. A metal foil according to claim 1 wherein the barrier layer has a thickness in the range of 0.00005 to 0.005 inches.

8. A metal foil according to claim 1, wherein the barrier layer is present in an amount of less than 20 milligrams barrier layer material per square inch of barrier layer.

9. An improved catalyst carrier body, comprising:
   a metal foil substrate;
   a barrier layer coated directly on at least a portion of at least one surface of the metal foil substrate, wherein the barrier layer consists essentially of aluminum oxide, silicon dioxide and at least 2% magnesium oxide by weight based on the total weight of the barrier layer, and wherein the barrier layer is present on the surface of the foil in an amount of at least 1.5 milligrams barrier layer material per square inch of barrier layer; and
   a rare-earth metal containing catalyst layer coated on at least a portion of the barrier layer.

10. A catalyst carrier body according to claim 9, wherein the catalyst layer is at least one element selected from the group consisting of cerium, lanthanum, yttrium, niobium, titanium, molybdenum, thallium, platinum, palladium, rhodium and iridium.

11. A catalyst carrier body according to claim 9, wherein the barrier layer includes 3–10% magnesium oxide, by weight, based on the total weight of the barrier layer.

12. A catalyst carrier body according to claim 9, wherein the barrier layer includes 3–10% magnesium oxide, by weight, and 5–10% silicon dioxide, by weight, based on the total weight of the barrier layer.

13. A catalyst carrier body according to claim 9, wherein the barrier layer includes 3–10% magnesium oxide, by weight, and 35–60% silicon dioxide, by weight, based on the total weight of the barrier layer.

14. A catalyst carrier body according to claim 9, wherein the barrier layer includes 3–10% magnesium oxide, by weight, and 50–97% aluminum oxide, by weight, based on the total weight of the barrier layer.

15. A catalyst carrier body according to claim 9, wherein the barrier layer includes 3–10% magnesium oxide, by weight, 35–60% silicon dioxide, by weight, and 40–62% aluminum oxide, by weight, based on the total weight of the barrier layer.

16. A catalyst carrier body according to claim 9, wherein the barrier layer is present in an amount of less than 20 milligrams barrier layer material per square inch of barrier layer.

17. A catalyst carrier body according to claim 9, wherein the barrier layer has a thickness in the range of 0.00005 to 0.005 inches.

18. A method for reducing permanent thermal expansion of a metal foil in the presence of a rare-earth metal containing catalyst, said method comprising:
   providing a metal foil substrate having surfaces;
   applying a barrier layer directly on at least a portion of at least one surface of the metal foil substrate in an amount of at least 1.5 milligrams barrier layer material per square inch of barrier layer, wherein the barrier layer consists essentially of aluminum oxide, silicon dioxide and at least 2% magnesium oxide by weight based on the total weight of the barrier layer.

19. A method according to claim 18, wherein the barrier layer is applied by
   (a) preparing a barrier coating layer comprising a slurry of aluminum oxide, or a precursor thereof, silicon dioxide, or a precursor thereof, and magnesium oxide, or a precursor thereof, in an amount sufficient to provide at least 2% magnesium oxide by weight based on the total weight of the barrier layer;
   (b) applying the barrier coating layer to at least a portion of at least one surface of the metal foil substrate;
   (c) drying the coated metal foil substrate; and
   (d) optionally, calcining the dried metal foil substrate.

20. The method according to claim 19, wherein said slurry is an aqueous slurry.

21. The method of claim 19 wherein the barrier coating layer comprises a slurry of metal oxide precursor(s) and the coated metal foil substrate is heated and optionally calcined, for a time and at a temperature sufficient to convert the metal oxide precursor(s) to corresponding metal oxide(s).

22. The method of claim 18, wherein the barrier layer is applied in an amount sufficient to provide less than 20 milligrams of the barrier layer material per square inch of barrier layer.

23. The method of claim 18, wherein the barrier layer is applied in an amount sufficient to provide a thickness range of 0.0005 to 0.005 inches.

* * * * *